United States Patent [19]

Aignesberger et al.

[11] 3,859,316

[45] Jan. 7, 1975

[54] EXTRUDED MOLDED ARTICLES AND PROCESS FOR THE PRODUCTION THEREOF

[75] Inventors: Alois Aignesberger; Hans-Gunter Rosenbauer, both of Trostberg; Heriberg Hiendl, Straubing, all of Germany

[73] Assignees: Suddeutsche Kalkstickstoff-werke AG, Trostberg, Germany; Hifra La Loche S. ar. l, La Loche N.E., Switzerland

[22] Filed: Aug. 7, 1970

[21] Appl. No.: 62,148

[30] Foreign Application Priority Data
Aug. 8, 1969 Germany............................ 1940510

[52] U.S. Cl. ............................... 260/395 B, 106/90
[51] Int. Cl............................................. C08g 51/04
[58] Field of Search............. 260/395, 67.7 C, 67.6; 106/90

[56] References Cited
UNITED STATES PATENTS 2,603,623   7/1952   Bonzagni ........................... 260/67.6
3,068,190   12/1962  D'Alelio............................ 260/45.2
3,159,593   12/1964  Morini ............................. 260/29.4
3,240,736   3/1966   Beckwith .......................... 260/29.2
3,251,800   4/1966   Cooley.............................. 260/39
3,277,059   10/1966  D'Alelio............................ 260/67.6
3,338,851   8/1967   Taylor.............................. 260/15
3,346,534   10/1967  Bills................................ 260/39

FOREIGN PATENTS OR APPLICATIONS 1,169,582   11/1969  Great Britain ....................... 106/90
1,510,314   1/1968   France Primary Examiner—Morris Liebman
Assistant Examiner—S. M. Person
Attorney, Agent, or Firm—Fisher, Christen & Sabol

[57] ABSTRACT

Molded bodies are formed by extruding a mixture of an inorganic binder containing small amounts of an aminoplast resin, preferably an acid modified resin which is based on an amino-s-triazine containing at least 2 NH$_2$ groups. The mixture may also contain fillers and other additives.

5 Claims, No Drawings

EXTRUDED MOLDED ARTICLES AND PROCESS FOR THE PRODUCTION THEREOF

The present invention relates to extruded molded pieces comprising inorganic binders, fillers and additives.

A process for the production of molded asbestos-cement products is known, according to which a hydromodifier is added to a cement mixture consisting of 1.0 to 60 % asbestos fibers, 10 to 85 % cement and 14 to 50 % water, in order to guarantee its plasticity and dimensional stability during the forming process (Austrian Pat. No. 256,689). One can add to said mixture, prior to the forming process, customary additive substances such as sand. One can use as a hydromodifier organic substances with a molecular weight above 400, for example methyl cellulose, ethylene oxide polymers, acrylamide acrylic acid copolymers, polyvinyl alcohol and others.

The production of construction sections shaped by extrusion from anhydrite containing masses is known from German Patent No. 814,421, whereby small quantities of highly molecular weight glue-like substances, for example cellulose ether, starch or similar substances, are added to the mixing water. These substances may also be premixed, for example with the anhydrite during grinding.

Austrian Pat. No. 205,400 describes a process for the production of lightweight building plates and insulating bricks made of an anhydrite binder which is ground medium fine plaster and water, optionally with the addition of fillers, such as sawdust, chaff, rush, vermiculite, etc., whereby the mass is mixed prior to extrusion and must be kneaded in a suitable device.

Furthermore a process for the production of construction elements, such as roof tiles or similar articles, is described in German Pat. No. 812,414, wherein natural or synthetic anhydrite, optionally after addition of fillers, is made into a dough with water, whereupon the mass is shaped on extrusion presses or other conventional devices.

In all the above mentioned methods of production, difficulties occur during the molding which the prior art has attempted to counteract use of suitable additives or through certain grain sizes of the starting materials. Another disadvantage of these processes is, that the products must be stored 1 to 2 weeks until they achieve sufficient strength. If it is desired to achieve a high degree of strength more quickly, then the products must be post-treated in an autoclave when cement and/or lime is used as a binder; in the case of products containing calcium sulfate as a binder, such an aftertreatment is not possible.

The object of the present invention consists in the development of molded pieces of a composition based on inorganic binders as well as fillers, which can be both easily extruded and also achieve a high degree of strength within a short time without any necessity for treatment in an autoclave.

Compositions which contain at least one aminoplast resin having acid groups based on an amino-s-triazine with at least 2 $NH_2$-groups as an additive will fulfill these requirements.

The molded pieces extruded according to the invention and based on inorganic binders and fillers are characterized by containing at least one aminoplast resin having acid groups based on an amino-s-triazine with at least 2 $NH_2$-groups as additive, as well as possibly other additives.

It is surprising that according to the invention a good moldability through extrusion as well as a high degree of early strength of the extruded molded pieces can be achieved with a single additive.

The acid groups which the aminoplast resin must contain are preferably sulfonic acid groups. Even small additions of the resins containing acid groups, that is to say from 0.1 to 5 % by weight, preferably even only from 0.5 to 1 % by weight, related to the binder used, will suffice as additives, the percentages relating to solid resin. Preferably liquid and solid types of resins obtained commercially as Melment are used as aminoplast resins containing acid groups, based on an amino-s-triazine with at least 2 $NH_2$-groups. These resins are condensation products of an amino-s-triazine, containing sulfonic acid groups, with at least 2 $NH_2$-groups and formaldehyde. 20 % aqueous solutions of these resins have a viscosity of 5 to 300 cP (centipoise).

Additionally, small quantities of an anion active surfactant (surface active agent), that is to say from 0.01 to 1 % by weight, related to the binder used, can be used effectively as additives for certain binder mixtures. As a result the moldability will still be improved without the strength values being essentially impaired. Anion active surfactants suitable for addition are commercial products, for example sodium salts of alkylaryl sulfo acids or the sodium salts of a sulfonated fatty acid condensation product.

Clinkers and cements, calcium sulfate, magnesia binders and lime can be used as binders.

The substances which are customarily used as fillers in molded parts based on the above mentioned binders can be, for example stone dust, sand (maximum grain size 15 mm), vermiculite, perlite, puzzolanic materials, organic fibrous materials, such as cellulose, as well as inorganic fibrous materials, such as asbestos, rock wool and others.

When molding anhydrite mixtures, potassium sulfate in small quantities is used effectively as a known stimulant or activator.

By extruded molded parts in the sense of the present invention is meant finished parts such as slabs, pipes, street and highway construction elements, window frames, windowsills, girders, enclosures of swimming pools, fire resistant molded bodies, distancing elements, carrier slabs and profiles of various types.

An important advantage of the molded bodies according to the invention is a particularly good early strength, which for example shortens the time of hardening considerably in the case of anhydrite bonded molded bodies and makes an aftertreatment in the autoclave superfluous in the case of cement bonded molded bodies.

Another advantage is the good moldability of the mixtures described, which, among other things, results in low consumption of current.

EXAMPLE 1

24 parts by weight sand (maximum grain size 5 mm), 2.4 parts by weight stone dust and 8 parts by weight portland cement 275 were premixed in a dry state in a forced circulation mixer, then water and additives mentioned below were added and mixing was continued (see Table 1).

The mortar was extruded through a 4 × 4 cm nozzle. Two days after production, the extruded strands were cut and the flexural strength and compressive strength were determined. The results are shown in Table 1.

Table 1

| Example Number | Type of Additive | Quantity Parts by Weight | Water Parts by Weight | Flexural Strength After 2 days kp/cm² | Compressive Strength After 2 days kp/cm² |
| --- | --- | --- | --- | --- | --- |
| 1a | — | — | 3.4 | 80 | 349 |
| 1b | Melment L 10 | 0.4 | 2.55 | 92 | 434 |
| 1c | Melment L 300 | 0.4 | 2.8 | 87 | 381 |
| 1d | 98% Melment L 10[1] + 2% surfactant | 0.4 | 2.53 | 87 | 373 |
| 1e | 50% Melment L 300[1] + 49% Melment L 10[1] + 1% surfactant[2] | 0.4 | 2.5 | 84 | 442 |

[1] Melment® L 10 or L 300 are 20% solutions of an amino-s-triazine resin containing acid groups.
[2] Na-salts and alkyl-aryl sulfo acids.

EXAMPLE 2

In a forced circulation mixer, 24 parts of weight sand (maximum grain size 5 mm), 2.4 parts by weight stone dust and 8.4 parts by weight anhydrite binder (premixed from 8 parts by weight anhydrite AB 200 (DIN 4208), 0.32 parts by weight portland cement 275, 0.08 parts by weight potassium sulfate) were mixed dry, water and an additive (see Table 2) were subsequently added and mixed until a homogeneous mortar was achieved. The anhydrite mortar was extruded through a 4 × 4 cm nozzle.

Four days after manufacture the molded strands were cut. Flexural strength and compressive strength were determined. The results are shown in Table 2.

Table 2

| Example Number | Type of Additive | Quantity Parts by Weight | Water Parts by Weight | Flexural Strength After 2 days kp/cm² | Compressive Strength After 2 days kp/cm² |
| --- | --- | --- | --- | --- | --- |
| 2a | — | — | 3.55 | 30 | 110 |
| 2b | Melment L 10[1] | 0.4 | 2.42 | 57 | 310 |
| 2c | 98% Melment L 10[1] + 2% surfactant[2] | 0.4 | 2.37 | 42.5 | 258 |

[1],[2] = see footnotes in Table 1

After intensive mixing, the mixture was extruded through a 1.7 × 1.7 cm nozzle. The results are shown in Table 3.

Table 3

| Ex. No. | Additive | After 1 day Flexural Strength | After 1 day Compressive Strength | After 3 days Flexural Strength | After 3 days Compressive Strength |
| --- | --- | --- | --- | --- | --- |
| 3a | A | 52 | 165 | 83 | 289 |
| 3b | B | 64 | 220 | 89 | 291 |

Similarly good results will also be achieved with finely ground quartz sand.

Without additive A or B, the mixture described cannot be extruded.

EXAMPLE 3

The following mixture was produced in a forced circulation mixer:

| 58 | parts by weight | portland cement 375 |
| --- | --- | --- |
| 12 | do. | asbestos mixture from types 5, 6, 7, according to Quebec Standard Tests |
| 20 | do. | water |
| 1 | do. | additive A or B |

| Additive A consists of | 99.9 | parts by weight | Melment L 10[1] and |
| --- | --- | --- | --- |
|  | 0.1 | parts by weight | surfactant[2] |
| Additive B consists of | 49.95 | parts by weight | Melment L 10[1] |
|  | 50.0 | do. | Melment L 300[1] and |
|  | 0.05 | do. | surfactant[2] |

[1],[2] = see footnotes in Table 1.

EXAMPLE 4

In a forced circulation mixer, 24 parts by weight sand (maximum grain size 5 mm), 2.4 parts by weight stone dust and 8.4 parts by weight anhydrite binder (consisting of 8 parts by weight anhydrite AB 200 (DIN 4208), 0.32 parts by weight calcium hydroxide and 0.08 parts by weight potassium sulfate) were mixed dry; 2.42 parts by weight water and 0.4 parts by weight Melment L 10[1] were added subsequently. The mixing was continued until a homogeneous mortar was achieved. This anhydrite mortar was extruded through a 4 × 4 cm nozzle. The results are shown in Table 4.

Table 4

|  | Strengths after 4 days | |
| --- | --- | --- |
|  | Flexural Strength kp/cm$^2$ | Compressive Strength kp/cm$^2$ |
| Without Melment L 10[1] | 28 | 102 |
| With 0.4 parts by weight Melment L 10[1] | 50 | 285 |

[1] = see footnote in Table 1.

We claim:

1. The process for the production of a finished molded article of a desired shape from inorganic binder and fillers, which process comprises intensively mixing said binder and fillers with from 0.1 to 5% by weight on a solids basis and based on said binder of an aqueous solution of an aminoplast resin containing sulfonic acid groups and based on an acid modified amino-s-triazine containing at least 2 NH$_2$ groups for a time sufficient to achieve a homogenous mixture, and extruding said mixture through an orifice whereby said article is molded into said desired finished shape by said extrusion through said orifice, said article exhibiting substantially increased flexural and compressive strength in from 1 to 4 days time after said extrusion.

2. The process according to claim 1 wherein the amount of aminoplast resin is from 0.5 to 1% by weight based on said binder.

3. The process according to claim 1 wherein from 0.01 to 1% by weight based on said binder of an anion active surfactant is also included in said mixture.

4. The process according to claim 1 wherein the inorganic binder is selected from the group consisting of clinker, cement, calcium sulfate, magnesia binder, lime and mixtures thereof and said fillers are selected from the group consisting of stone dust, sand and organic and inorganic fibrous materials.

5. The process according to claim 1 wherein the aminoplast resin is a condensation product of formaldehyde with an acid modified amino-s-triazine containing sulfonic acid groups and at least 2 NH$_2$ groups, which resin in a 20% by weight aqueous solution has a viscosity between 3 and 500 centipoises.

* * * * *

UNITED STATES PATENT OFFICE
CERTIFICATE OF CORRECTION

Patent No. 3,859,316          Dated January 7, 1975

Inventor(s) Alois Aignesberger et al.

It is certified that error appears in the above-identified patent and that said Letters Patent are hereby corrected as shown below:

On the Title page:

line [73] Assignees: "Suddeutsche Kalkstickstoff-werke AG" should be -- Suddeutsche Kalkstickstoff-Werke AG --

"Hifra La Loche" should be -- Hifra Le Locle --.

"La Loche N.E." should be -- Le Locle, N.E. --.

Signed and Sealed this

Twenty-first Day of March 1978

[SEAL]

Attest:

RUTH C. MASON
Attesting Officer

LUTRELLE F. PARKER
Acting Commissioner of Patents and Trademarks